US009749412B1

(12) United States Patent
Bostick et al.

(10) Patent No.: US 9,749,412 B1
(45) Date of Patent: Aug. 29, 2017

(54) PREDICTIVE FILE SYNCHRONIZATION

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/271,282

(22) Filed: Sep. 21, 2016

(51) Int. Cl.
*G06F 15/16* (2006.01)
*H04L 29/08* (2006.01)

(52) U.S. Cl.
CPC .......... *H04L 67/1095* (2013.01); *H04L 67/06* (2013.01); *H04L 67/1097* (2013.01); *H04L 67/322* (2013.01)

(58) Field of Classification Search
CPC .................................................. H04L 67/1095
USPC ........................................................ 709/219
See application file for complete search history.

(56) References Cited

U.S. PATENT DOCUMENTS

| 7,096,263 | B2 | 8/2006 | Leighton et al. |
| 8,255,545 | B1* | 8/2012 | Schmidt .............. H04L 67/1095 709/227 |
| 9,069,444 | B1 | 6/2015 | Hansen et al. |
| 9,330,106 | B2* | 5/2016 | Piasecki ............ G06F 17/30176 |
| 2005/0258806 | A1* | 11/2005 | Janik ................. G06F 17/30749 320/155 |
| 2008/0147747 | A1* | 6/2008 | Cardamore ......... H04L 67/1095 |
| 2009/0150569 | A1* | 6/2009 | Kumar .............. G06F 17/30174 709/248 |
| 2009/0282020 | A1 | 11/2009 | McSheffrey et al. |
| 2009/0282169 | A1* | 11/2009 | Kumar ................ H04L 67/1095 709/248 |
| 2011/0173240 | A1* | 7/2011 | Bryniarski .......... G06F 17/3028 707/822 |
| 2012/0030378 | A1* | 2/2012 | Kaila .................. H04L 67/1095 709/248 |
| 2013/0060841 | A1* | 3/2013 | Knight ................... G06Q 30/06 709/203 |
| 2013/0212067 | A1* | 8/2013 | Piasecki ............ G06F 17/30176 707/620 |
| 2013/0226876 | A1 | 8/2013 | Gati et al. |

(Continued)

OTHER PUBLICATIONS

IP.com; System and method for semi-automatic and personalized data synchronization from cloud to different devices, Aug. 6, 2013.

(Continued)

*Primary Examiner* — Imad Hussain
(74) *Attorney, Agent, or Firm* — Garg Law Firm, PLLC; Rakesh Garg; Christopher K. McLan

(57) ABSTRACT

A prediction is computed from an input data, at a time, that a user will need to use a set of files during a future period. From the set of files, a subset of those files is selected that are designated for synchronization with a remote storage over a data network. A priority of the file is computed according to a characteristic of each file. The files in the subset are arranged according to priorities corresponding to the files. A synchronization operation is caused to occur, to synchronize the subset of files in an order of priorities associated with the files in the subset.

17 Claims, 4 Drawing Sheets

(56) References Cited

U.S. PATENT DOCUMENTS

| | | | |
|---|---|---|---|
| 2014/0114920 A1* | 4/2014 | Zhang | H04L 67/06 707/634 |
| 2014/0188868 A1 | 7/2014 | Hunter et al. | |
| 2015/0026257 A1* | 1/2015 | Balakrishnan | H04N 21/233 709/204 |
| 2015/0199414 A1* | 7/2015 | Braginsky | G06F 17/30132 707/613 |
| 2015/0350371 A1* | 12/2015 | Woods | H04L 67/2852 707/620 |
| 2015/0358297 A1 | 12/2015 | Endahl et al. | |
| 2016/0014194 A1* | 1/2016 | Kaplinger | H04L 67/06 709/217 |
| 2016/0050270 A1* | 2/2016 | Kadoda | H04L 67/06 709/217 |

OTHER PUBLICATIONS

IP.com; Smart Cloud Storage Synchronization, Apr. 7, 2015.
IP.com; A Method and System for Device Virtualization with a Cloud-Based Continuous Synchronization Service, Apr. 1, 2016.

\* cited by examiner

PREDICTIVE FILE SYNCHRONIZATION

TECHNICAL FIELD

The present invention relates generally to a method, system, and computer program product for managing the file synchronization between multiple computing devices. More particularly, the present invention relates to a method, system, and computer program product for predictive file synchronization.

BACKGROUND

Hereinafter, any data that can be placed in a folder of a file-system in a computing device of any kind is referred to as a "file" unless expressly disambiguated where used. Hereinafter, any operation of a computing device configured to cause a local version of a file to include identical content as a remote version of the file is referred to as a "synchronization", "syncing", or "sync" activity or operation unless expressly disambiguated where used. A file is said to be "synced" with another file when the two files include identical content.

A local file resides on a computing device on which the file is used by a user. A remote file resides on a computing device or data storage device that is accessible over a data network from the computing device of the user.

For example, a local file may be stored on a user's laptop computer or a smartphone, and a remote file may be stored at a desktop computer or a network attached storage (NAS) at the user's home or at a storage device managed by data storage service.

Often, but not necessarily, a remote file can be stored in a data storage device that is operating in a cloud data processing environment. Users can store individual files or folders in their allotted cloud storage space and retrieve them from one or more computing devices. Users can also share their files stored on the cloud with other users. Generally, a software application—referred to herein as a sync app—operates on a computing device to connect from the computing device to the remote data storage device or service over a data network and synchronize the local and remote files in the folder or folders that are designated for synchronization.

Hereinafter, a reference to a local device is a reference to a computing device of any suitable kind where a local file is stored. Hereinafter, a reference to a remote storage is a reference to a computing device or data storage device of any suitable kind where a remote file is stored.

SUMMARY

The illustrative embodiments provide a method, system, and computer program product. An embodiment includes a method that predicts from an input data, at a time, using a processor and a memory of a computing device, that a user will need to use a set of files during a future period. The embodiment selects from the set of files, a subset of files that are designated for synchronization with a remote storage over a data network. The embodiment computes a priority of a file in the subset according to a characteristic of the file in the subset. The embodiment arranges the files in the subset according to priorities corresponding to the files. The embodiment causes a synchronization operation to synchronize the subset of files in an order of priorities associated with the files in the subset.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
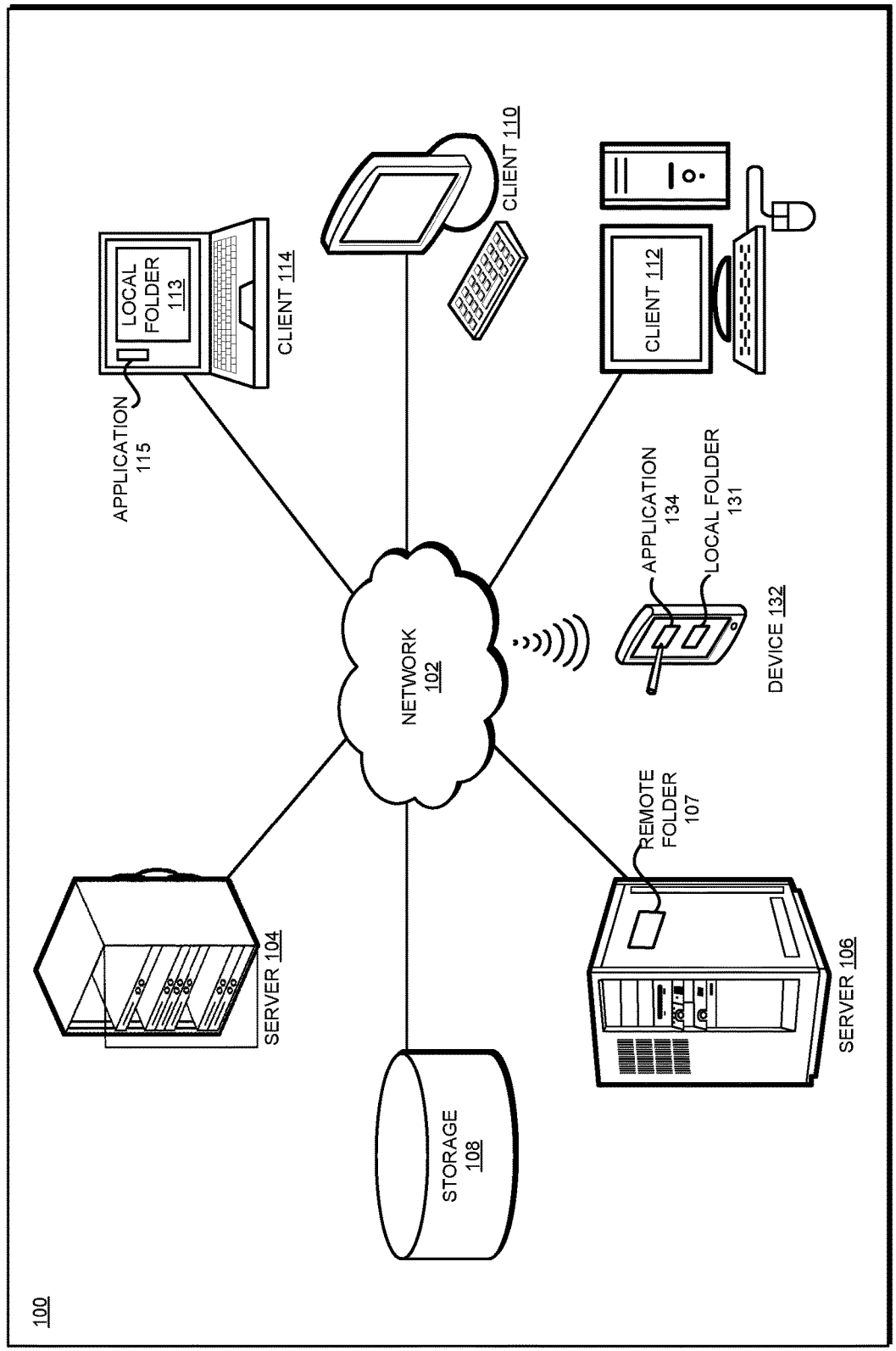
FIG. 1 depicts a block diagram of a network of data processing systems in which illustrative embodiments may be implemented.

The illustrative embodiments recognize that file syncing is an activity that is dependent on the availability of a data network. Presently, when a local device has network accessibility to a remote storage, all files that are designated for syncing are synced between the local folder or folders and the corresponding remote folder or folders.

The illustrative embodiments recognize that presently, the sync operation of a presently-available sync app is neither selective nor prioritizing in which designated files to sync and when. Generally, a presently-available sync app will sync all designated files in no particular order using all network bandwidth available to the sync app.

Some sync apps do throttle, limit, or otherwise cap their bandwidth consumption in order to minimize disruption or degradation of the network performance for other applications that are also using the network from the local device. However, the illustrative embodiments recognize that such throttling is only of the total bandwidth allocated to the sync apps for the sync operations but the sync apps still use that throttled bandwidth to sync all designated files in no particular order.

Generally, many files are designated for syncing and only some files contain changes that have to be synced. Regardless, presently available syncing methods at least test each designated file to determine whether that file has to be synced. Thus, even though eventually only some files that have changed are synced, all files are tested for changes, and the files with changes are synced in no particular order or priority.

The illustrative embodiments recognize that the syncing of all files, or even testing all files for changes, without prioritizing which files should be synced first and which files should be synced later is an inefficient use of the available network resources. The illustrative embodiments recognize that not all files have to be selected for syncing or even testing for changes every time a sync operation occurs. Some designated files may include changes but should not be selected under certain circumstances or network conditions. For example, when insufficient network bandwidth, insufficient data transmission speeds, insufficient time period for which the network is available, insufficient security configuration available in the network, insufficient limit on total data transmission volume, and one or more of these or other conditions exist, selectively syncing some changed designated files and not selecting other changed designated files can be useful.

For example, a user may need only three of the ten files that have changed. Therefore, syncing only the three files that the user needs is a far better utilization of a network experiencing a condition than syncing all ten files regardless of the user's needs.

Furthermore, even the files that are selected for syncing should be prioritized or ordered to better address the user's need. Suppose that from the three changed files, the user needs file A in the next two minutes, file B in the next fifteen minutes, and file C four hours later. Syncing without prioritizing, as presently available sync apps do, may sync file C before file A causing the user to wait for file A—a file needed right now—while file C—a file not needed for some time—syncs.

The illustrative embodiments used to describe the invention generally address and solve the above-described problems and other problems related to predictive file synchronization.

An embodiment can be implemented as a software application. The application implementing an embodiment can be configured as a modification of an existing sync app, as a separate application that operates in conjunction with an existing sync app, a standalone application, or some combination thereof.

An embodiment assesses a condition existing in a data network over which file synchronization can be performed. One example embodiment performs a speed test to determine whether the speed or data rate of data transmission, data reception, or both, each of which can be a network condition contemplated herein, are below a threshold speed. Another example embodiment performs a security test to determine whether the security configuration of the network, which can be a network condition contemplated herein, is below a threshold security configuration. Another example embodiment performs a connection configuration test to determine whether the time limit set for using the network, total data upload and/or download allowed in a network session, or both, each of which can be a network condition contemplated herein, is below a threshold amount of time or data volume, respectively.

When one or more condition is insufficient, or does not satisfy a corresponding criterion, an embodiment activates file selection and prioritization for sync operation. A condition satisfies a corresponding criterion by having a value equal to or higher than a threshold value set for the condition. Conversely, a condition fails to satisfy a corresponding criterion by having a value less than a threshold value set for the condition.

In one embodiment, a user configures the criterion and the corresponding threshold value. In another embodiment, the embodiment selects a suitable criterion and threshold through machine learning or from an analysis of the performance metrics of one or more past file sync operations.

When the network has a condition that fails to satisfy a criterion set for the condition, an embodiment analyzes one or more types of input data to estimate or predict a user's needs during a future period. For example, a location data of a location of the user may be a type if input data that may be used to predict a user's need. For example, the user may have historically used a certain file while present at that location, and a higher than a threshold likelihood exists that the user will need that file again due to the user's presence at the location.

As another example, an email message in an email application may be a type if input data that may be used to predict a user's need. For example, the user may have sent or received an email message that names a certain file, references a project associated with a certain file, uses keywords associated with the file, and the like. Accordingly, a higher than a threshold likelihood exists that the user will need that file due to the reference in the email data. As one non-limiting example, the email message may be selected by associating the email message with a location specified therein, and detecting from the location data that the user is at the specified location, making the email relevant for analysis in the described manner.

Similarly, calendar data, to-do list data, data and time data, instant messaging or text messaging data, and a variety of other types of data, alone or in conjunction with one or more of other types of data such as the non-limiting location data described herein, can be used to predict a need of the user. An embodiment analyzes the input data to determine a need—i.e., a situation application to the user where a designated file is likely to be needed. Furthermore, this analysis by another embodiment outputs not only the designated files that are likely to be needed but also a time window within which a designated file is likely to be needed.

from the files that are predicted to be needed, an embodiment further selects, those files that are designated for synchronization, i.e., present in a local folder that is synced with a remote folder, and lists the selected files for synchronization. An embodiment further determines an order in which the files included in the list should be synced.

To perform the ordering or prioritization, the embodiment orders the files according to the time window in which they are predicted to be needed by the user. The file, whose time window begins closest to a current time at which the ordering is being performed, is ordered or prioritized first in the list. The file, whose time window begins farthest from the current time, is ordered or prioritized last in the list. Other files are prioritized in between depending on the distances of the beginning of their respective time windows from the current time. A time other than the beginning of the time window can similarly be used in place of the beginning of the time window without departing from the scope of the illustrative embodiments.

These examples of manners of selecting and prioritizing files for syncing are not intended to be limiting. From this disclosure, those of ordinary skill in the art will be able to conceive many other manners of selecting and prioritizing files for syncing and the same are contemplated within the scope of the illustrative embodiments.

For example, a designated file that has the highest security setting amongst all files on the list may be prioritized first (or last) depending on the needs of a particular implementation. As another example, a designated file that has the largest size amongst all files on the list may be prioritized first (or last)

depending on the needs of a particular implementation. As another example, a designated file that has a dependency or another relationship with another file on the list may be prioritized equal to, higher than, or lower than the related file, depending on the needs of a particular implementation.

An embodiment sends a prioritized list of selected designated files to a sync app for syncing with the remote storage. The sync app syncs the files on the list in the order the files are listed on the list.

One embodiment continues to monitor input data for any changes in the needs of the user. For example, after a prioritized list has been sent to the sync app, the user may receive an email that changes the user's focus to a different project, which requires a different file. The different file may not have been listed on the previous list or may have been previously assigned a certain priority on the previous list.

An embodiment recomputes the need prediction, the prediction of the likelihood of needing the different file and the corresponding time window, and the priority of the different file. The embodiment produces a new or revised prioritized list and sends to the sync app. The sync app revises the files to be synced and the order in which they are to be synced according to the revised prioritized list.

The manner of predictive file synchronization described herein is unavailable in the presently available methods. A method of an embodiment described herein, when implemented to execute on a device or data processing system, comprises substantial advancement of the functionality of that device or data processing system in improving how a network is utilized for synchronizing files with a remote system under a condition that exists in the network and while maximizing the resources available in the network.

The illustrative embodiments are described with respect to certain types of files, folders, sync operations, sync apps, input data, time windows, predictions, lists, priorities, ordering, conditions, thresholds, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
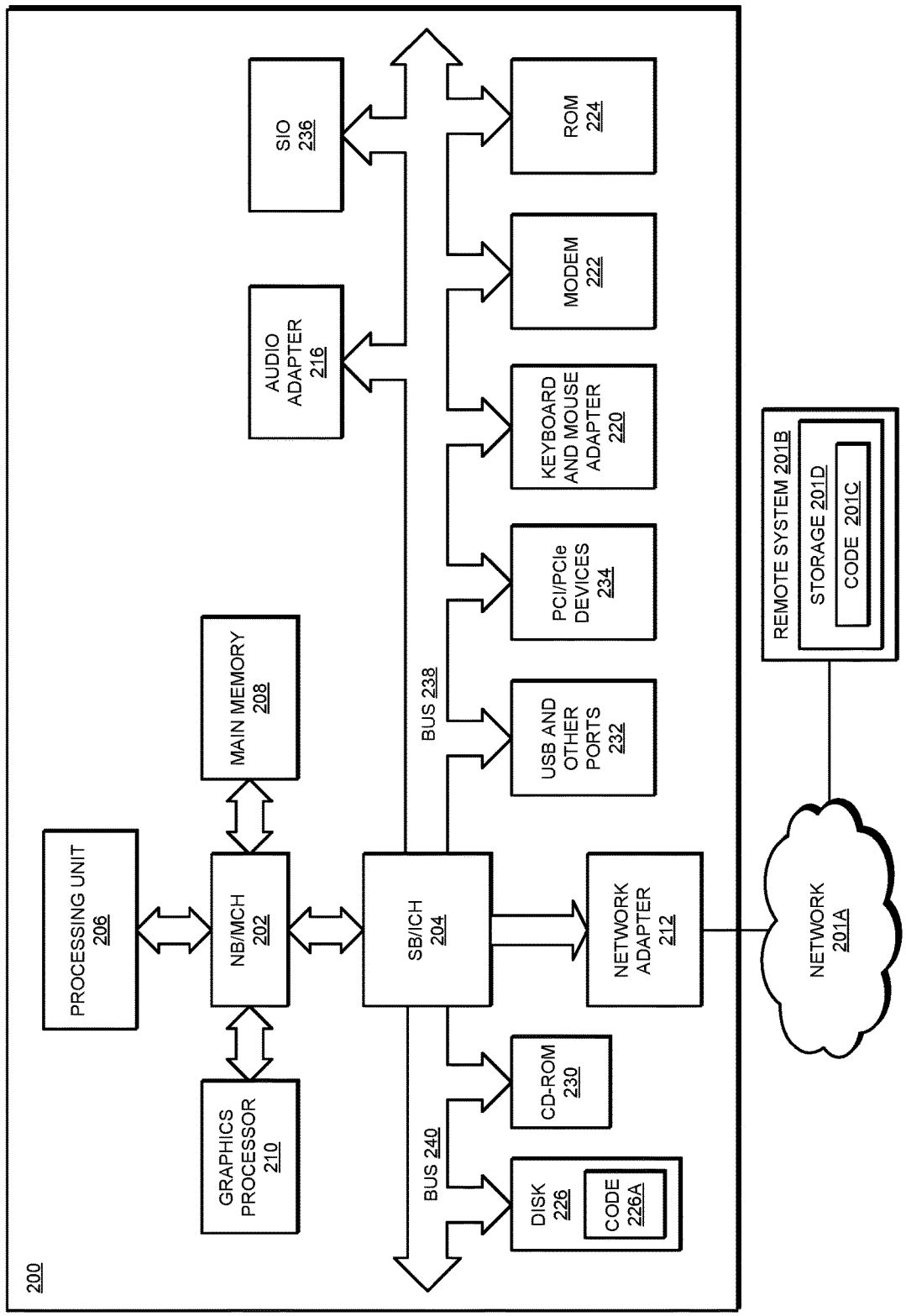
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 115 implements an embodiment described herein on a type of computing device used by a user, e.g., on client computer 114. Application 115 selectively syncs certain changed files between local folder 113 and remote folder 107. Similarly, application 134, which implements an embodiment described herein, may be configured on another type of computing device used by the user, e.g., on device 132. Application 134 selectively syncs certain changed files between local folder 131 and remote folder 107.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 115 or 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
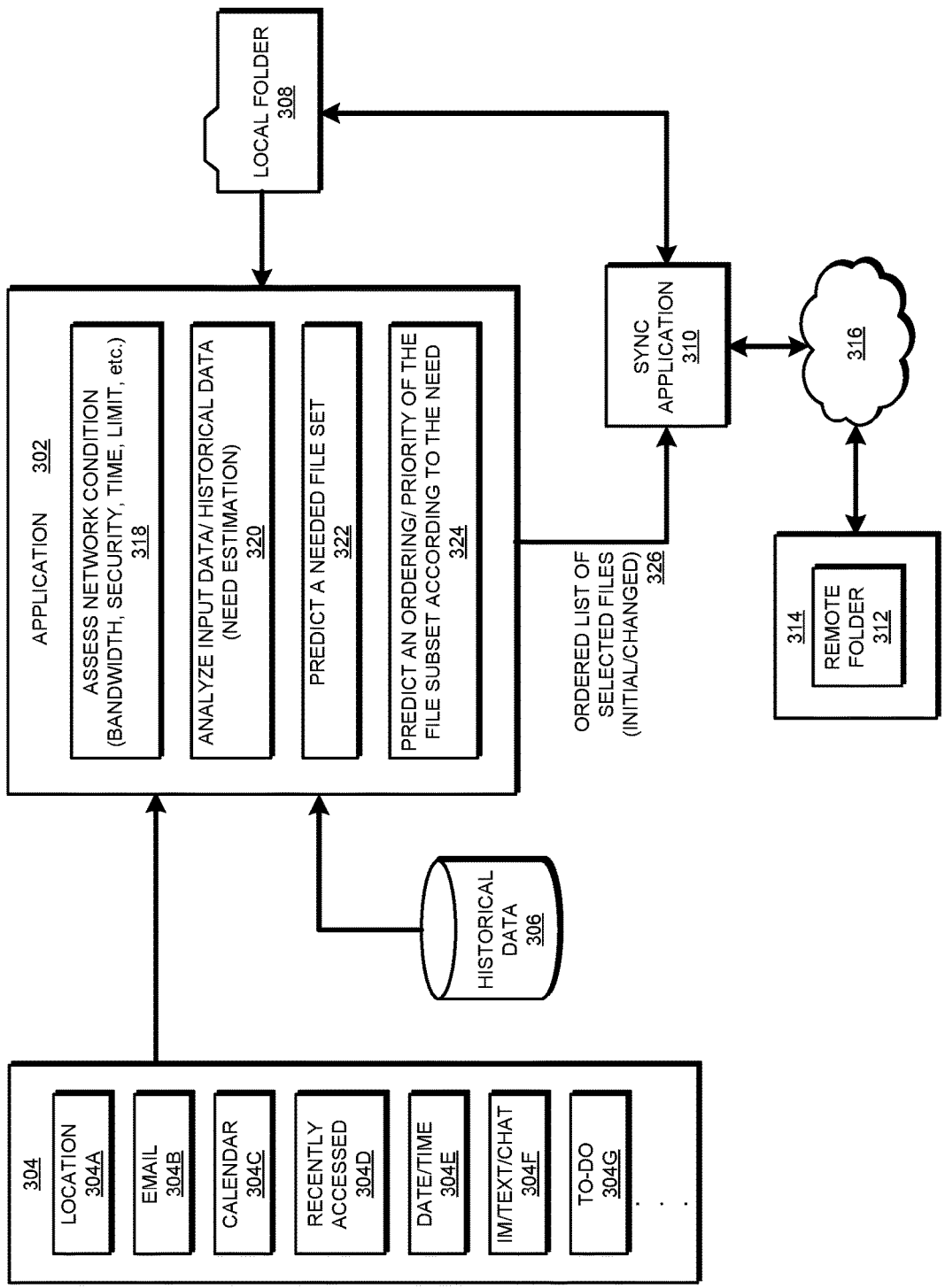
FIG. 3 depicts a block diagram of an example configuration for predictive file synchronization in accordance with an illustrative embodiment.

With reference to FIG. 3, this figure depicts a block diagram of an example configuration for predictive file synchronization in accordance with an illustrative embodiment. Application 302 is an example of application 115 or 134 in FIG. 1.

Input data 304 can be any one or more of location data 304A, email message 304B, calendar entry data 304C, history of recently accessed files 304D, data time data 304E, instant message or text/chat message 304F, to-do list data 304G, or other data usable in an analysis of a user's need for files in a manner described herein. Historical data 306 is a historical record of files that the user has accessed or used during one or more past periods. To that extent, history of recently accessed files 304D may be a part of historical data 306. Historical data 306 may also include data that indicates not only a file that has been used in the past but also one or more circumstantial data associated with that usage. For example, historical data 306 may also include a location from where a file was accessed, a project under which a file was accessed, a frequency with which a file has been accessed, whether a file has been accessed according to a preplanned use or due to an abruptly arising reason, and data descriptive of many other circumstances of a past use of a file.

Local folder 308 is a local folder on the local device where application 302 is executing. Local folder 308 provides to application 302 information that indicates whether a file predicted to be needed is designated and present in local folder 308 for syncing. Sync app 310 executes on the local device and syncs local folder 308 with remote folder 312, which is an example of remote folder 107 in FIG. 1. Remote folder 312 is maintained in remote storage 314 and is synced with local folder 308 over data network 316, which may have one or more conditions existing therein, as described in this disclosure.

Component 318 assesses one or more conditions that may be existing in network 316 in a manner described herein. If one or more conditions fail to satisfy a corresponding criterion, component 320 analyzes input data 304 to predict a need of the user during a future period. For example, component 320 may perform natural language processing (NLP) on an email message content to determine a project that is the subject of the discussion in the email. Thus, component 320 concludes that the user is likely to have a need for information related to the project in a time window that is also extracted from the email or a calendar entry for the project.

Different combinations of input data 304A-304G and/or historical data 306 can be used in a similar manner to configure component 320 to predict different needs of the user during different time windows. Such other configurations are contemplated within the scope of the illustrative embodiments.

According to the needs, or use circumstances, predicted by component 320, component 322 predicts a set of files that are likely to be needed in those use circumstances. Component 322 determines that a subset of the set of predicted files are located in local folder 308.

Component 324 prioritizes the files in the subset according to their use circumstance. As described herein, a consideration for the prioritization may be a time gap between a time of the prioritization and a time window when a file is likely to be needed. Many other considerations for the prioritization are possible as described herein, and these and other considerations are contemplated within the scope of the illustrative embodiments.

Component 324 produces ordered list of the selected subset of files 326 and sends to sync app 310. List 326 may be an initial list or a revised list according to the needs changes resulting from the monitoring of input data 304 as described herein. Between local folder 308 and remote folder 312, and over network 316, sync app 310 synchronizes the files listed in the list according to the order in which the files are listed.

Figure 4:
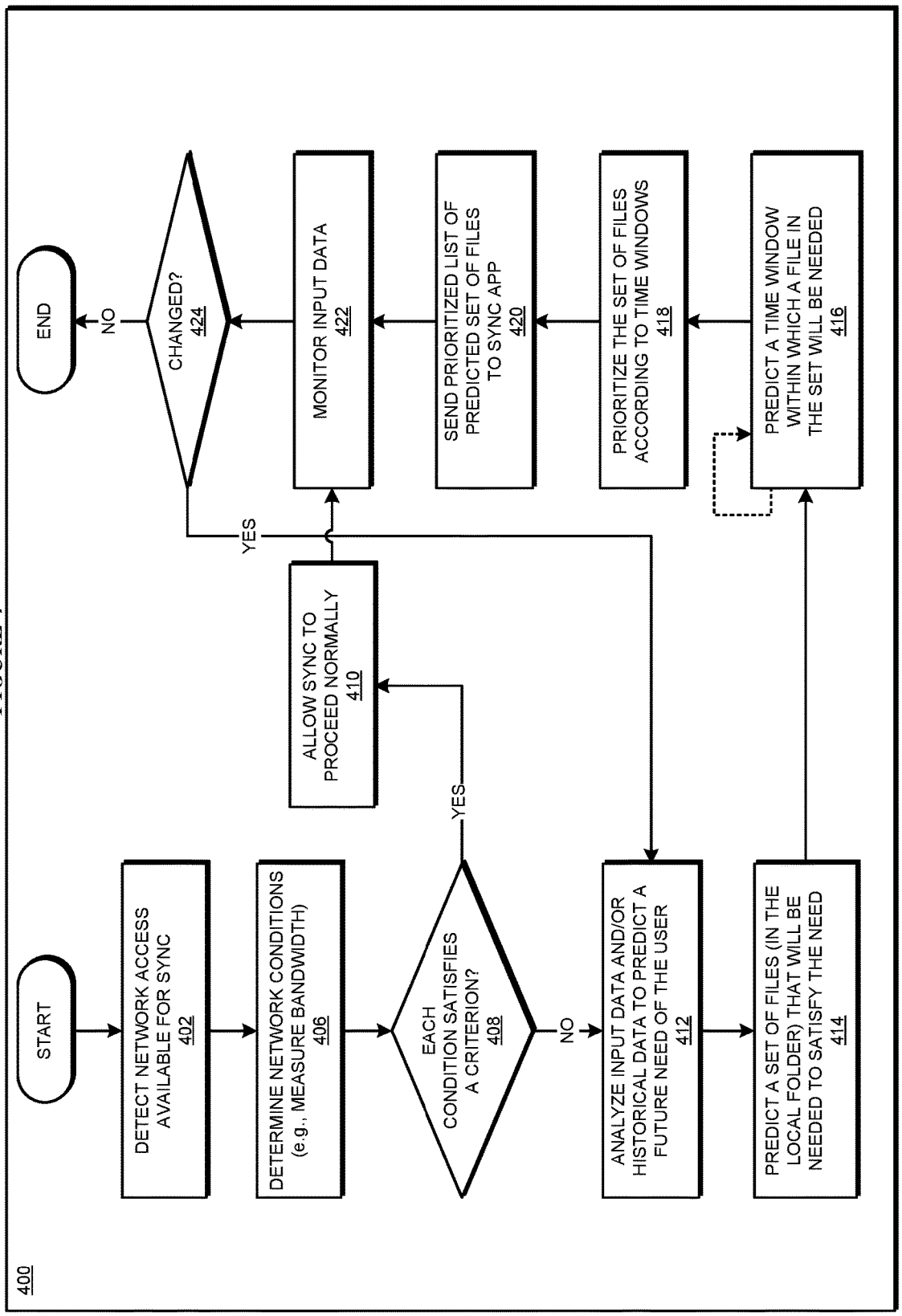
FIG. 4, depicts a flowchart of an example process for predictive file synchronization in accordance with an illustrative embodiment.

With reference to FIG. 4, this figure depicts a flowchart of an example process for predictive file synchronization in accordance with an illustrative embodiment. Process 400 can be implemented in application 302 in FIG. 3.

The application detects that network access is available for syncing files (block 402). The application determines a network condition that may exist in the network (block 406). The application determines whether each condition satisfies a corresponding criterion specified for the condition (block 408). If each determined condition satisfies the criterion/criteria specified for the condition ("Yes" path of block 408), the application optionally allows the syncing of files to proceed normally as in the prior-art (block 410). Alternatively (not shown), regardless of whether each condition satisfies its corresponding criterion or criteria, the application may be configured to perform the selection and prioritization of files as described herein.

If each determined condition does not satisfy the criterion/criteria specified for the condition ("No" path of block 408), or in the alternative implementation where the operation of block 410 is not performed, the application analyzes input data and/or historical data to predict a future need—use circumstance in which one or more files will be used (block 412). The application predicts a set of files that are likely to be needed in the use circumstances (block 414). The files in the set of files are selected such that each file in the set is present in a synced local folder.

The application predicts a time window in which a file from the set will be needed (block 416). The application prioritizes the files in the set of files according to the time window (block 418). Process 400 can be modified to use other considerations for prioritization and such modifications are contemplated within the scope of the illustrative embodiments.

The application sends to a sync app the prioritized list of the predicted set of designated files (block 420). The application may end process 400 thereafter or may continue to monitor the input data for changes in the use circumstances (block 422).

The application determines whether a use circumstance may have changed due to a changed or new input data (block 424). If a use circumstance changes ("Yes" path of block 424), the application returns process 400 to block 412. If no changes to a use circumstance are detected ("No" path of block 424), the application ends process 400 thereafter.

Thus, a computer implemented method, system or apparatus, and computer program product are provided in the illustrative embodiments for predictive file synchronization and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining whether a condition existing in a data network satisfies a criterion for the condition;
   responsive to the condition failing to satisfy the criterion:
      predicting from an input data, at a time, using a processor and a memory of a computing device, that a user will need to use a set of files during a future period;
      selecting from the set of files, a subset of files that are designated for synchronization with a remote storage over the data network;
      predicting, for a file in the subset, a time of future use, wherein the time of future use is within the future period, and wherein a characteristic of the file in the subset comprises the time of the future use of each file in the subset of files;
      computing a priority of a file in the subset according to the characteristic of the file in the subset;
      arranging the files in the subset according to priorities corresponding to the files; and
      causing a synchronization operation to synchronize the subset of files in an order of priorities associated with the files in the subset.

2. The method of claim 1, wherein the condition comprises a limitation on a bandwidth of the data network.

3. The method of claim 1, wherein the condition comprises a security setting in the data network.

4. The method of claim 1, wherein the condition comprises a duration of availability of the data network.

5. The method of claim 1, further comprising:
   omitting, as a part of the causing the synchronization operation, a second file, wherein the second file is designated for synchronization with the remote storage, and wherein the second file include a change that has to be synchronized with the remote storage.

6. The method of claim 1, further comprising:
   determining a security configuration corresponding to each file in the subset of files, wherein the characteristic comprises the security configuration of each file in the subset of files.

7. The method of claim 1, further comprising:
   determining a size corresponding to each file in the subset of files, wherein the characteristic comprises the size of each file in the subset of files.

8. The method of claim 1, further comprising:
   determining a use circumstance occurring during the future period;
   relating an information about the use circumstance with a file in the set of files; and
   selecting the file into the set of files.

9. The method of claim 8, further comprising:
   selecting, from the input data, historical data, wherein the historical data identifies a circumstance for using the file during a past period, and wherein the selecting the file into the set of files is responsive to determining that the circumstance exists at the time.

10. The method of claim 1, further comprising:
    parsing a message using natural language processing (NLP), wherein the input data comprises a location of the computing device at the time and the message; and
    identifying from the parsing that the message is related to the file, wherein the selecting the file into the set is responsive to the identifying.

11. A computer usable program product comprising one or more computer-readable storage devices, and program instructions stored on at least one of the one or more storage devices, the stored program instructions comprising:
    program instructions to determine whether a condition existing in a data network satisfies a criterion for the condition;
    responsive to the condition failing to satisfy the criterion:
       program instructions to predict from an input data, at a time, using a processor and a memory of a computing device, that a user will need to use a set of files during a future period;
       program instructions to select from the set of files, a subset of files that are designated for synchronization with a remote storage over the data network;

program instructions to predict, for a file in the subset, a time of future use, wherein the time of future use is within the future period, and wherein a characteristic of the file in the subset comprises the time of the future use of each file in the subset of files;

program instructions to compute a priority of a file in the subset according to the characteristic of the file in the subset;

program instructions to arrange the files in the subset according to priorities corresponding to the files; and program instructions to cause a synchronization operation to synchronize the subset of files in an order of priorities associated with the files in the subset.

12. The computer usable program product of claim 11, wherein the condition comprises a limitation on a bandwidth of the data network.

13. The computer usable program product of claim 11, wherein the condition comprises a security setting in the data network.

14. The computer usable program product of claim 11, wherein the condition comprises a duration of availability of the data network.

15. The computer usable program product of claim 11, wherein the computer usable code is stored in a computer readable storage device in a data processing system, and wherein the computer usable code is transferred over a network from a remote data processing system.

16. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to determine whether a condition existing in a data network satisfies a criterion for the condition;

responsive to the condition failing to satisfy the criterion:

program instructions to predict from an input data, at a time, using a processor and a memory of a computing device, that a user will need to use a set of files during a future period;

program instructions to select from the set of files, a subset of files that are designated for synchronization with a remote storage over the data network;

program instructions to predict, for a file in the subset, a time of future use, wherein the time of future use is within the future period, and wherein a characteristic of the file in the subset comprises the time of the future use of each file in the subset of files;

program instructions to compute a priority of a file in the subset according to the characteristic of the file in the subset;

program instructions to arrange the files in the subset according to priorities corresponding to the files; and program instructions to cause a synchronization operation to synchronize the subset of files in an order of priorities associated with the files in the subset.

\* \* \* \* \*